(12) United States Patent
Peachman et al.

(10) Patent No.: US 6,357,665 B1
(45) Date of Patent: Mar. 19, 2002

(54) CONFIGURATION OF IC CARD

(75) Inventors: Anthony David Peachman, Kent; Ian Stephen Simmons, Cambs, both of (GB)

(73) Assignee: Mondex International Limited, London (GB)

(*) Notice: Subject to any disclaimer, the term of this patent is extended or adjusted under 35 U.S.C. 154(b) by 0 days.

(21) Appl. No.: 09/162,605

(22) Filed: Sep. 29, 1998

Related U.S. Application Data

(60) Provisional application No. 60/073,906, filed on Feb. 6, 1998, and provisional application No. 60/072,561, filed on Jan. 22, 1998.

(51) Int. Cl.[7] .............................................. G06K 19/06
(52) U.S. Cl. ........................................ 235/492; 235/487
(58) Field of Search ................................ 235/380, 379, 235/382, 441, 492, 487; 902/1, 2

(56) References Cited

U.S. PATENT DOCUMENTS

| | | | |
|---|---|---|---|
| 4,882,474 A | 11/1989 | Anderl et al. | |
| 4,901,276 A | 2/1990 | Iijima | |
| 4,949,257 A | 8/1990 | Orbach | 364/401 |
| 5,014,312 A | 5/1991 | Lisimaque et al. | |
| 5,019,970 A * | 5/1991 | Yamaguchi et al. | 711/115 |
| 5,029,208 A * | 7/1991 | Tanaka | 380/21 |
| 5,126,541 A * | 6/1992 | Shinagawa | 235/438 |
| 5,162,989 A | 11/1992 | Matsuda | 364/401 |
| 5,206,938 A * | 4/1993 | Fujioka | 235/380 |
| 5,293,577 A | 3/1994 | Hueske et al. | |
| 5,452,431 A | 9/1995 | Bournas | |
| 5,542,081 A * | 7/1996 | Geronimi | 235/380 |
| 5,581,708 A | 12/1996 | Iijima | |
| 5,588,146 A | 12/1996 | Leroux | |
| 5,682,027 A | 10/1997 | Bertina et al. | |
| 5,825,875 A | 10/1998 | Ugon | |
| 6,035,380 A * | 3/2000 | Shelton et al. | 711/163 |

FOREIGN PATENT DOCUMENTS

| | | |
|---|---|---|
| EP | 0152024 | 8/1985 |
| EP | 0157303 | 10/1985 |
| EP | 0190733 | 8/1986 |
| EP | 0218176 | 4/1987 |
| EP | 0261030 | 3/1988 |
| EP | 0275510 | 7/1988 |
| EP | 0292248 | 11/1988 |
| EP | 0325506 | 1/1989 |
| EP | 0328289 | 8/1989 |
| EP | 0354793 | 2/1990 |
| EP | 0451936 | 10/1991 |
| EP | 0466969 | 1/1992 |
| EP | 0475837 | 3/1992 |
| EP | 0547741 | 9/1992 |
| EP | 0537756 | 4/1993 |
| EP | 0540095 | 5/1993 |
| EP | 0559205 | 8/1993 |
| EP | 0588339 | 3/1994 |
| EP | 0594493 | 4/1994 |
| EP | 0636998 | 2/1995 |
| EP | 0647902 | 4/1995 |
| EP | 0686947 | 5/1995 |
| EP | 0666550 | 8/1995 |
| EP | 0707290 | 9/1995 |
| EP | 0751460 | 1/1997 |
| FR | 2536928 | 6/1984 |
| FR | 2667171 | 9/1990 |

(List continued on next page.)

*Primary Examiner*—Karl D. Frech
*Assistant Examiner*—Daniel St. Cyr
(74) *Attorney, Agent, or Firm*—Baker Botts L.L.P.

(57) ABSTRACT

A secure multiple application card system including an IC card having a microprocessor, a ROM and an EEPROM, wherein program instructions are stored in the ROM at time of manufacture, and at time of personalization, an address table is stored in the EEPROM. Upon operation of the IC card, the operating system calls the program instructions, including codelets and primitives, in accordance with the addresses indicated in the address table.

48 Claims, 6 Drawing Sheets

FOREIGN PATENT DOCUMENTS

| | | | |
|---|---|---|---|
| FR | 2667171 | 3/1992 | |
| FR | 2687816 | 8/1993 | |
| JP | 64-81084 | 3/1989 | |
| JP | 2592856 | 12/1996 | |
| JP | 034846 A * | 2/2001 | ................ 235/492 |
| JP | 067210 A * | 3/2001 | ................ 235/492 |
| WO | WO8707062 | 11/1987 | |
| WO | WO8809019 | 11/1988 | |
| WO | WO9005960 | 5/1990 | |
| WO | WO9101538 | 2/1991 | |
| WO | WO9213322 | 8/1992 | |
| WO | WO9320538 | 10/1993 | |
| WO | WO9321612 | 10/1993 | |
| WO | WO9522810 | 8/1995 | |
| WO | WO9619771 | 6/1996 | |
| WO | WO9628795 | 9/1996 | |
| WO | WO9638825 | 12/1996 | |
| WO | WO9843212 | 10/1998 | |
| WO | WO9910824 | 3/1999 | |
| WO | WO9916031 | 4/1999 | |

* cited by examiner

ADDRESS TABLE

| NAME | ADDRESS |
|---|---|
| CODELET 1 | 1000 |
| CODELET 2 | 1050 |
| PRIM 1 | 2020 |
| PRIM 2 | 2040 |
| PRIM 3 | 3020 |
| PRIM 4 | 3080 |

FIG. 5

CONFIGURATION OF IC CARD

PRIORITY APPLICATION

This application claims priority to U.S. Provisional Application Ser. No. 60/073,906, filed on Feb. 6, 1998, entitled "Remote Configuration of IC Card," and U.S. Provisional Application Ser. No. 60/072,561, filed on Jan. 22, 1998, entitled "Codelets."

RELATED APPLICATION

This application is related to U.S. Provisional Application Ser. No. 60/072,561 filed on Jan. 22, 1998 entitled Codelets and U.S. Patent Application Ser. No. 09/076,551 filed on May 12, 1998 entitled Secure Multiple Application Card System and Process, which are hereby incorporated by reference.

BACKGROUND OF INVENTION

Integrated circuit cards are becoming increasingly used for many different purposes in the world today. An IC card typically is the size of a conventional credit card on which a computer chip is embedded. It comprises a microprocessor, read-only-memory (ROM), electrically erasable programmable read-only-memory (EEPROM), an Input/Output (I/O) mechanism and other circuitry to support the microprocessor in its operations. An IC card may contain one or more applications in memory. MULTOS™ is a multiple application operating system which runs on IC cards, among other platforms, and allows multiple applications to be executed on the card itself. This allows a card user to run many programs stored in the card (for example, credit/debit, electronic money/purse and/or loyalty applications) irrespective of the type of terminal (i.e., ATM, telephone and/or POS) in which the card is inserted for use.

IC cards typically have limited storage capacity due to the size and cost restraints of locating memory on the card. Applications for multi-application smart cards are written in a programming language and are typically stored in the EEPROM whose contents can be changed during the lifetime of the card. One example of a programming language used in IC cards is the Multos Executable Language (MEL™). The MEL program instructions are read from EEPROM when they are executed and are interpreted by the operating system stored in ROM.

The ROM on the IC card includes the operating system written in assembler language code for the particular integrated circuit configuration (native language type code). The operating system code stored in ROM is fixed when the ROM is initially written and the information stored in ROM will not change for the life of the card.

Also present in ROM can be subroutines called primitives written in a native language code for the microprocessor which can be called by either the operating system itself or by applications when they are executed. Primitives are written in native language (i.e. assembler language) so that they can be executed very quicky and minimal interpretation of the instructions is necessary for execution. These primitives are collections of instructions which typically perform a desired function, such as a mathematical or cryptographic function. The instructions are never changed during the lifetime of the card. Any data used or accessed by the primitives are stored in EEPROM so that the contents of the data elements can change as necessary.

Also capable of being stored in ROM are "codelets," which are sets of instructions written in a programming language (not native language code). These codelets can be stored in ROM so as to maximize the usage of memory and allow ROM to store complete applications as well as primitives. The codelet can be as small as one instruction or as large as will fit into the remaining ROM memory space. For example, the purse application described above can be stored in ROM when the card is initialized in order to free up space in EEPROM for additional applications which can be loaded at any time.

Once data is stored in ROM, the data can never be modified or deleted and new data cannot be added after ROM is set. Moreover, in prior art systems, when the chip card is manufactured, a primitive address table is stored on the card which allows the operating system to locate the memory address of a primitive. This address table in ROM is also permanently set.

In this system, described in an application copending with this one (see Ser. No. 09/076,551, incorporated herein by reference), subsequent to card manufacture (at which time the ROM is fixed), the card is "personalized." This personalization step takes place either shortly after the card is made or anytime thereafter, up to a period of months or more. In the meantime, before the card is personalized, cards remain "blank" (i.e., unassigned to an individual user or group) and typically will be held at the card manufacturer or card issuer until needed. During this stage, because the cards have not yet been personalized, there is a greater risk that the cards would be improperly used.

The personalization step—in which the cards are assigned to a particular user or group—takes place at a location different from the card manufacturer generally under control of the card-issuer (i.e., the bank issuing the card) or some other personalization bureau ("PB"). A separate and preferably centrally located Certification Authority, which oversees the cards' interaction, provides the usually remote PB with appropriate security data, discussed below, to allow the PB to personalize (i.e., enable) the card, and to allow an application provider to load (either at the time of enablement or later) an application program, such as a purse application, onto the card.

One of the problems confronting multi-application card designers is how to address the situation where after the primitive or codelet is masked or otherwise stored in the ROM at the time of manufacture (and thus cannot thereafter be changed), the primitive or codelet needs to be replaced, modified or updated to fix a bug or to take advantage of a more efficient or effective routine. Another concern is to insure that the original primitives and codelets masked into ROM are not capable of use until the card is personalized, i.e. enabled for a particular user or group, with individual keys and identifiers. Accordingly it is an object of the invention to provide a method and system which solves these problems.

SUMMARY OF THE INVENTION

The applicant here has determined that one way to achieve these objectives is by loading in EEPROM at the personalization step and not at the manufacturing step an address table assigning to each primitive and/or codelet a name and corresponding address identifying where the primitive and/or codelet can be found in memory. In this manner, if the primitive masked in ROM at the time of manufacture needs to be changed, only the address for that primitive needs to be changed to point to the location in which the updated primitive sits. In addition, since neither an application nor the operating system will know where the primitive is located without a stored address table, the primitives cannot be called and the card cannot run until the primitive address table is loaded at the personalization step. This prevents use of the card until it is enabled at the personalization step.

BRIEF DESCRIPTION OF THE DRAWINGS

Further objects, features and advantages of the invention will become apparent from the following detailed description taken in conjunction with the accompanying figures showing illustrative embodiments of the invention, in which

FIG. 5 is a block diagram illustrating the address table loaded in EEPROM of an IC card at the personalization stage, in accordance with the present invention;

Figure 1:
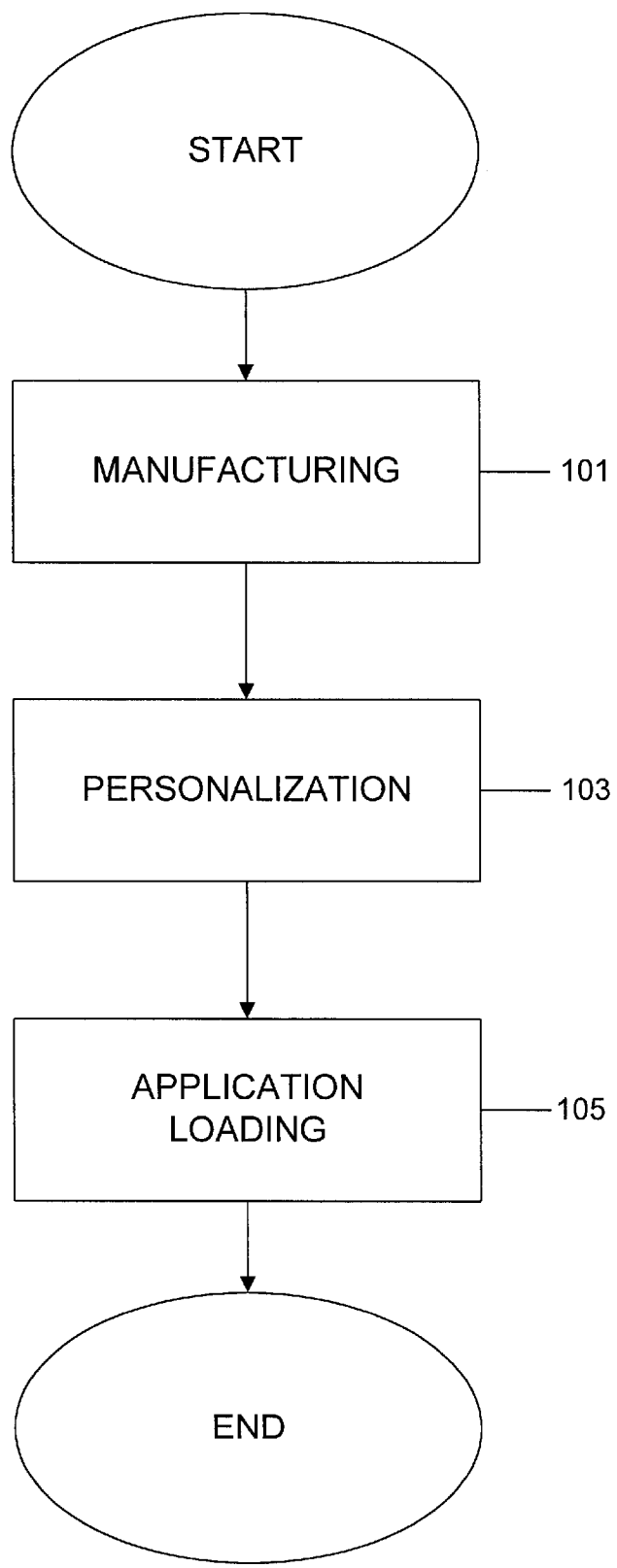
FIG. 1 is a block diagram illustrating the three states in the life of a multiapplication IC card in a secure system.

Throughout the figures, the same reference numerals and characters, unless otherwise stated, are used to denote like features, elements, components or portions of the illustrated embodiments. Moreover, while the subject invention will now be described in detail with reference to the figures, it is done so in connection with the illustrative embodiments. It is intended that changes and modifications can be made to the described embodiments without departing from the true scope and spirit of the subject invention as defined by the appended claims.

DETAILED DESCRIPTION OF THE DRAWINGS

FIG. 1 shows the three steps involved in providing an operational multi-application IC card in a secure system. The first step is the card manufacturing step 101. The second step is the personalization step 103 where card personalization data (also called entity authentication data) is loaded onto the card. The third step is the application loading step 105 which checks to see if a card is qualified to receive an application, i.e., when the personalization data is checked against the application permissions data associated with the application to be loaded. Each of these three steps is described in detail in co-pending application Ser. No. 09/076,551.

Figure 2:
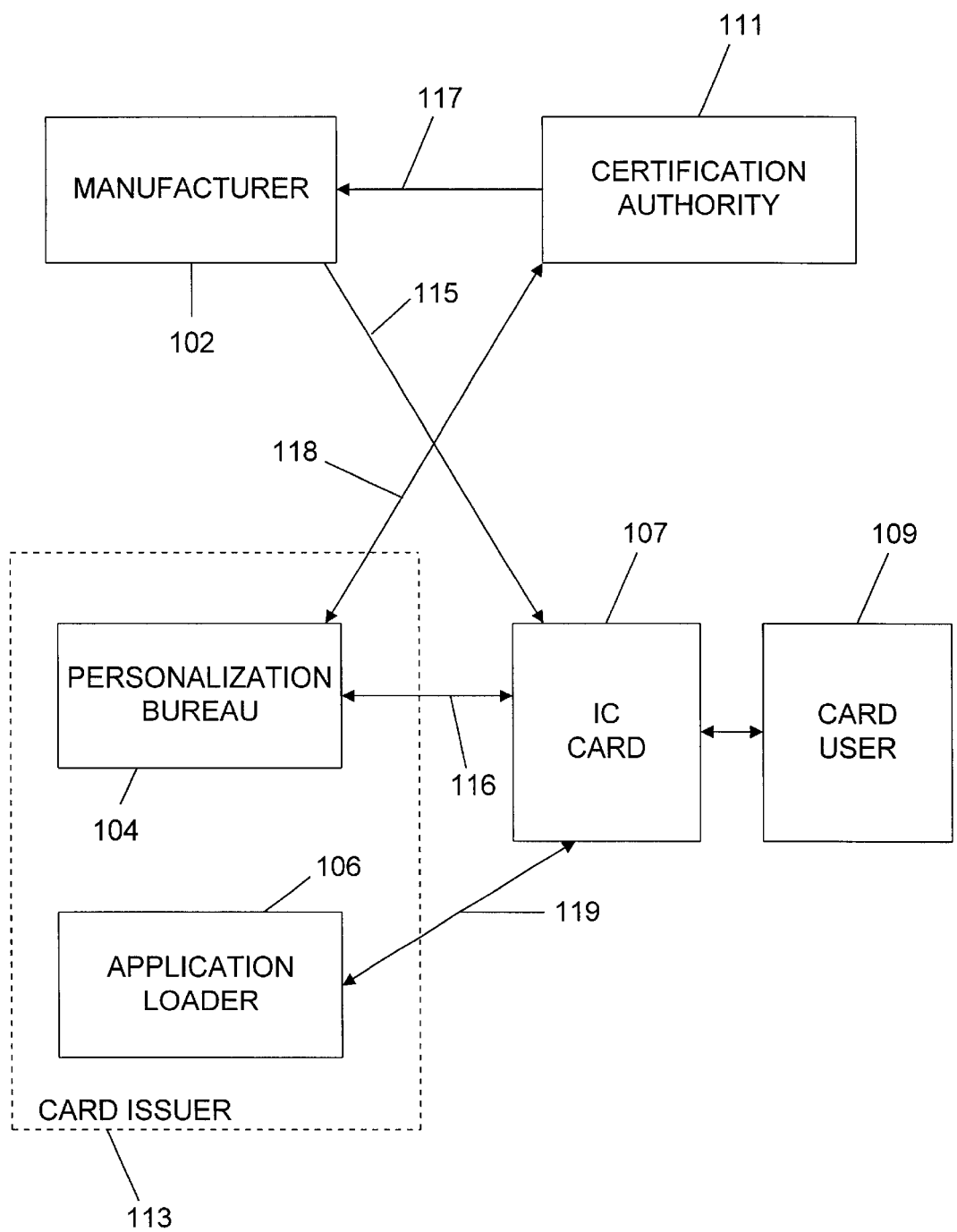
FIG. 2 is a block diagram showing the components of the system architecture for the enablement process of an IC card in a secure multi-application IC card system.

FIG. 2 shows the components of the system architecture for the card initialization process of an IC card in a secure multiple application IC card system. The system includes a card manufacturer 102, a personalization bureau 104, an application loader 106, the IC card 107 being initialized, the card user 109 and the certification authority 111 for the entire multiple application secure system. The card user 109 is the person or entity who will use the stored applications on the IC card.

The card user would contact a card issuer 113, such as a bank which distributes IC cards, and request an IC card with the two applications both residing in memory of a single IC card. The integrated circuit chip for the IC card would be manufactured by manufacturer 102 and sent to the card issuer 113 (or an entity acting on its behalf) in the form of an IC chip on a card. During the manufacturing process, data is transmitted 115 via a data conduit from the manufacturer 102 to card 107 and stored in IC card 107's memory. (Any of the data conduits described in this figure could be a telephone line, Internet connection or any other transmission medium.) The certification authority 111, which maintains encryption/decryption keys for the entire system, transmits 117 security data (i.e., global public key) to the manufacturer over a data conduit which is placed on the card by the manufacturer along with other data, such as the card enablement key and card identifier. The card's multiple application operating system is also stored in ROM and placed on the card by the manufacturer. After the cards have been initially processed, they are sent to the card issuer for personalization and application loading.

The card issuer 113 performs, or has performed by another entity, two separate functions. First, the personalization bureau 104 personalizes the IC card 107 in the ways described above, and second, the application loader 106 loads the application provided the card is qualified, as described in copending application Ser. No. 09/076,551.

Figure 3:
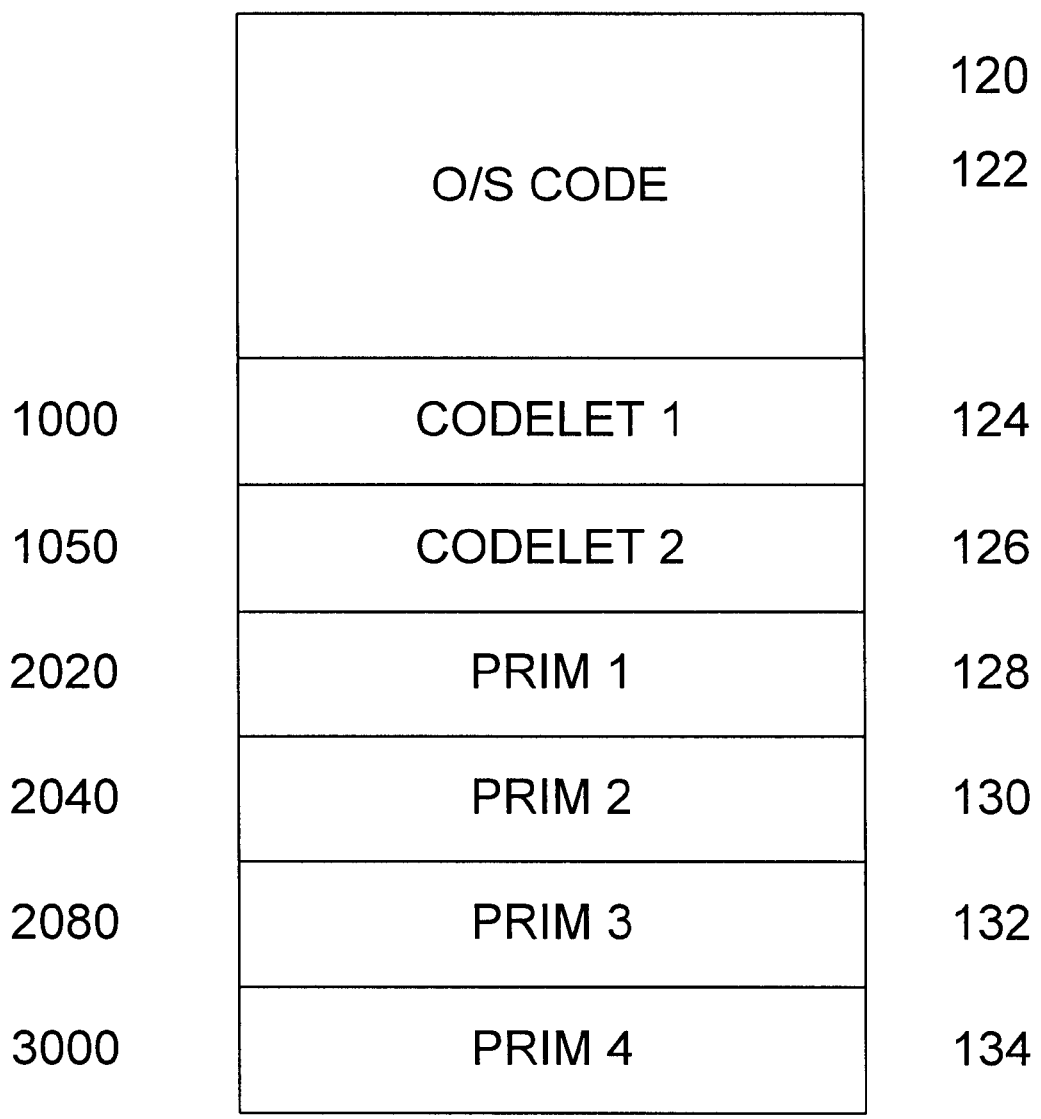
FIG. 3 is a block diagram illustrating the read only memory space segments for an IC card at the time of manufacture in accordance with the present invention.

Backtracking now to the time of manufacture, the ROM 120 of IC card is loaded, as illustrated in FIG. 3, with operating system code 122, codelets 1 and 2 identified respectively as 124, 126, at addresses 1000 and 1050, and primitives 1, 2, 3, 4 identified respectively are 128, 130, 132, 134, at addresses 2020, 2040, 2080, and 3000. The addresses are preferably physical addresses in ROM, an offset from a primitive starting pointer, or any other addressing scheme.

Figure 4:
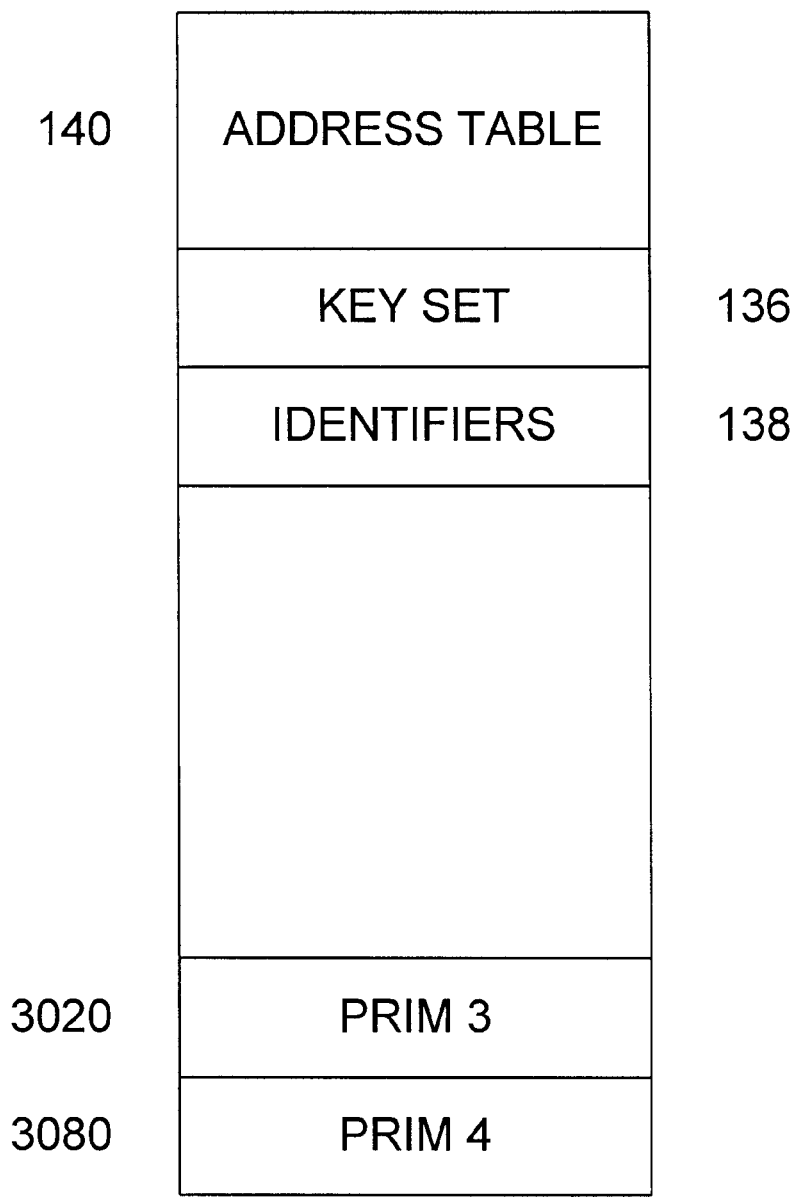
FIG. 4 is a block diagram illustrating the electrically erasable programmable read-only-memory space segments for an IC card after it has been loaded at the personalization stage in accordance with the present invention.

Subsequently, as described above, the card is personalized. The CA provides the PB with personalization information, which may include an individual key set 136. This information is sent to the PB usually at a remote location either through the Internet, by CD ROM or other data conduit or storage device. The PB remotely loads this information onto the EEPROM of the card (see FIG. 4) along with certain identifiers 138, such as a card identification, an issuer identification, product type identification (representing the type of application, i.e., purse, loyalty, etc.) and the date of loading. Additional primitive or codelet code can also be loaded at this time.

In accordance with this invention, the PB further remotely loads onto the EEPROM of the card the codelet/primitive address table 140. As shown in FIG. 5, this address table 140 contains a listing of the names of the codelets and primitives to be called by either the application program or operating system together with the memory addresses containing the code to be called. The location of code corresponding to a primitive call by the operating system or an application will be determined at this time. Thus, the controlling authority or system operator can select which version of code stored in the card will be executed when a particular primitive name is called.

In this particular case, a program instruction such as:

CALL PRIM 4 (DATA)

would result in a search of the address table to locate the address of PRIM 4. Because a new PRIM 4, with address 3080, was added into the programmable portion of the card memory at time of personalization to replace old PRIM 4, the operating system will simply fetch the new PRIM 4 at location 3080 as indicated in the address table. The old code at memory location 3000 will never be accessed by the operating system because there is no entry in the address table pointing to the old code.

Accordingly, this remote loading of an address table at the time of personalization allows the system (1) to control enablement until desired; and (2) to make use of a card despite an outdated codelet or primitive which may have been permanently placed in the card at the time of manufacture.

Figure 6:
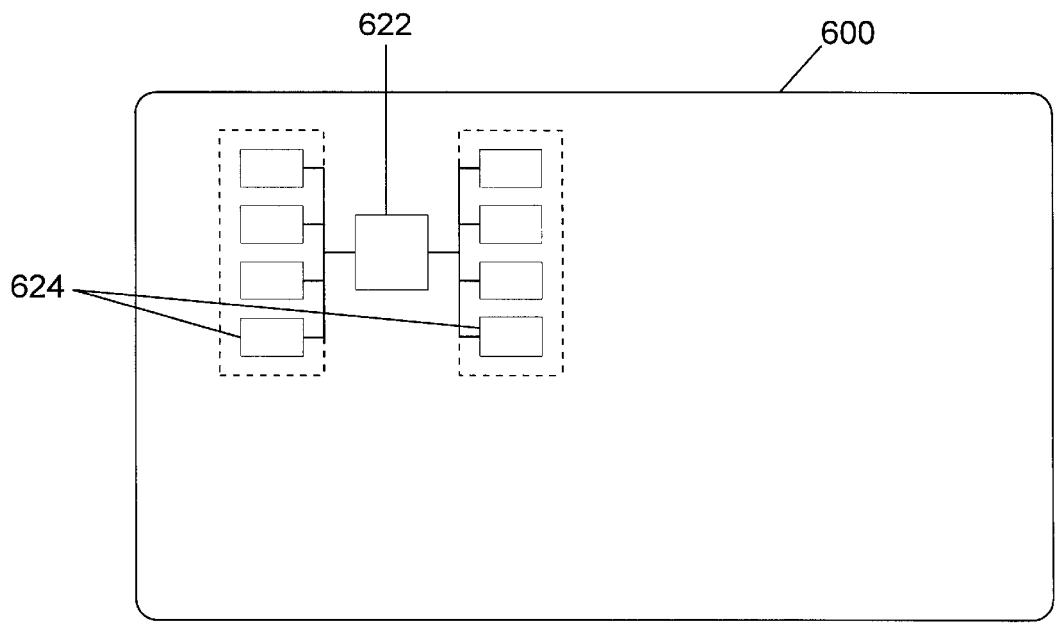
FIG. 6 illustrates an integrated circuit card which can be used in connection with this invention.

FIG. 6 illustrates a card 600 incorporating integrated circuit technology that can be used with the presently claimed invention. Card 600 looks similar to a conventional credit card, but also includes integrated circuit (IC) 622, which contains a microprocessor, and electrical contacts 624 for communication between IC 622 and devices external to card 600.

Card 600 can be used for example, as a credit card, a debit card, and/or as an electronic cash card, i.e., a card containing monetary value that can be transferred when the cardholder makes purchases, for example, a MONDEX™ cash card.

Figure 7:
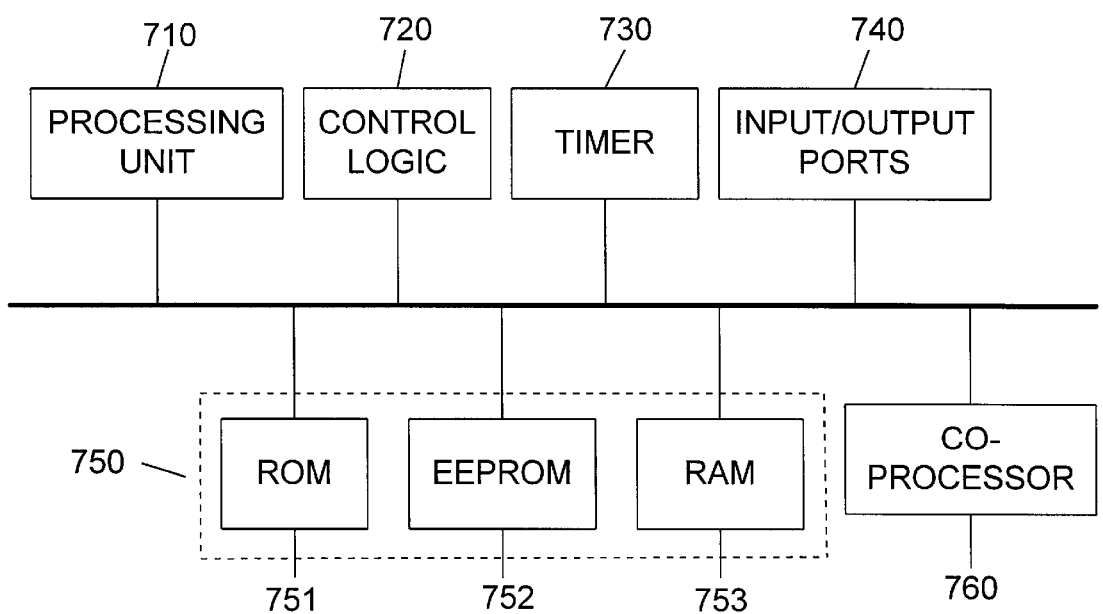
FIG. 7 is a functional block diagram of the integrated circuit shown in FIG. 6.

FIG. 7 is a functional block diagram of the IC section 622 and contains at least processing unit 710 and memory unit 750. Preferably, IC 722 also includes control logic 720, a timer 730, and input/output ports 740. IC section 722 can also include a co-processor 760. Control logic 720 provides, in conjunction with processing unit 710, the control necessary to handle communications between memory unit 750 and input/output ports 740. Timer 730 provides a timing reference signal for processing unit 710 and control logic 720. Co-processor 760 provides the ability to perform complex computations in real time, such as those required by cryptographic algorithms.

The foregoing merely illustrates the principles of the invention. It will thus be appreciated that those skilled in the art will be able to devise numerous systems and methods which, although not explicitly shown or described herein, embody the principles of the invention and are thus within the spirit and scope of the invention.

We claim:

1. A secure multiple application card system including an IC card comprising a microprocessor, a read-only memory and an electrically erasable programmable read only memory, said system comprising:

means for manufacturing said IC card and for storing at the time of manufacture in said read-only memory an operating system and a first set of programming instructions having a first address, without an address table with a second memory address of a second set of programming instructions; and means for personalizing said IC card after said time of manufacture and for storing at the time of personalization in said electrically erasable programmable read only memory said address table with the second memory address, wherein the operating system is incapable of accessing any set of programming instructions not having an address indicated in the address table, and wherein the address table is devoid of the first address such that the first set of programming instructions is rendered inaccessible after the time of personalization.

2. The system of claim 1, wherein at least one of said first and second sets of programming instructions comprises at least one primitive.

3. The system of claim 1, wherein at least one of said first and second sets of programming instructions comprises at least one codelet.

4. The system of claim 1, wherein said means for personalizing said IC card and for storing in said electrically erasable programmable read only memory further stores additional programming instructions.

5. The system of claim 4, wherein said additional programming instructions comprise at least one codelet.

6. The system of claim 5 wherein said address table comprises a listing of the codelets' names to be accessed and memory addresses containing the codelets.

7. The system of claim 4, wherein said additional programming instructions comprise at least one primitive.

8. The system of claim 7 wherein said address table comprises a listing of the primitives' names to be accessed and memory addresses containing the primitives.

9. The system of claim 1, wherein the second set of programming instructions replaces the first set of programming instructions at the time of personalization.

10. A process for providing a secure multiple application card system including an IC card comprising a microprocessor, a read-only memory and an electrically erasable programmable read only memory, said process comprising the steps of:

manufacturing said IC card and storing at the time of manufacture in said read-only memory an operating system and a first set of programming instructions having a first address, without an address table with a second memory address of a second set of programming instructions; and personalizing said IC card after said time of manufacture by storing in said electrically erasable programmable read only memory said address table with the second memory address, wherein the operating system is incapable of accessing any set of programming instructions not having an address indicated in the address table, and wherein the address table is devoid of the first address such that the first set of programming instructions is rendered inaccessible after the time of personalization.

11. The process of claim 10, wherein at least one of said first and second sets of programming instructions comprises at least one primitive.

12. The process of claim 10, wherein at least one of said first and second sets of programming instructions comprises at least one codelet.

13. The process of claim 10, wherein said step for storing in said electrically erasable programmable read only memory further includes storing additional programming instructions.

14. The process of claim 13, wherein said additional programming instructions comprises at least one primitive.

15. The system of claim 14, wherein said address table comprises a listing of the primitives' names to be called and memory addresses containing the primitives.

16. The system of claim 13, wherein said additional programming instructions comprises at least one codelet.

17. The system of claim 16, wherein said address table comprises a listing of the codeletes' names to be called and memory addresses containing the codelets.

18. The process of claim 10, wherein the second set of programming instructions replaces the first set of programming instructions at the time of personalization.

19. A process for providing a secure multiple application card comprising a microprocessor, a first memory and second memory, said process comprising the steps of:

manufacturing said card and storing at the time of manufacture in said first memory an operating system and a first set of programming instructions having a first address, without an address table with a second memory address of a second set of programming instructions; and personalizing said card after said storing step by storing in said second memory said address table with the second memory address, wherein said operating system is incapable of accessing any set of programming instructions not having an address indicated in the address table, wherein the address table is devoid of the first address such that the first set of programming instructions is rendered inaccessible after the time of personalization, and wherein the first set of programming instructions remains in said first memory after the time of personalization.

20. The process of claim 19, wherein at least one of said first and second sets of programming instructions comprises at least one primitive.

21. The process of claim 19, wherein at least one of said first and second sets of programming instructions comprises at least one codelet.

22. The process of claim 19, wherein said step for storing in said second memory further includes storing additional programming instructions.

23. The process of claim 22, wherein said additional programming instructions comprises at least one primitive.

24. The system of claim 23, wherein said address table comprises a listing of the primitives' names to be called and memory addresses containing the primitives.

25. The system of claim 22, wherein said additional programming instructions comprises at least one codelet.

26. The system of claim 25, wherein said address table comprises a listing of the codelets' names to be called and memory addresses containing the codelets.

27. The process of claim 19, wherein the second set of programming instructions replaces the first set of programming instructions at the time of personalization.

28. A secure multiple application card system including an IC card comprising a microprocessor, a read-only memory and an electrically erasable programmable read only memory, said system comprising:

means for manufacturing said IC card and for storing at the time of manufacture in said read-only memory an operating system and programming instructions including selected read-only programming instructions having selected addresses; and means for personalizing said IC card after the time of manufacture and for storing at the time of personalization in said electrically erasable programmable read only memory an address table with the selected addresses, wherein the operating system is incapable of accessing any programming instruction not associated with at least one address indicated in the address table, wherein said means for personalizing said IC card can be operated to store additional programming instructions in said electrically erasable programmable read only memory and includes means for inserting addresses for said additional programming instructions in said address table, wherein said additional programming instructions correspond to updated versions of the selected read-only programming instructions and the means for inserting addresses in the address table overwrites the selected addresses with corresponding addresses of the additional programming instructions, wherein the means for inserting addresses renders the address table devoid of the selected addresses, thereby rendering the selected read-only programming instructions inaccessible after the time of personalization.

29. The system of claim 28 wherein said programming instructions comprise at least one primitive.

30. The system of claim 29, wherein said additional programming instructions comprise at least one primitive.

31. The system of claim 29, wherein said address table comprises a listing of the names of the primitives to be accessed and memory addresses containing the primitives.

32. The system of claim 28, wherein said programing instructions comprise at least one codelet.

33. The system of claim 32, wherein said additional programming instructions comprise at least one codelet.

34. The system of claim 32, wherein said address table comprises a listing of the names of the codelets to be accessed and memory addresses containing the codelets.

35. A process for providing a secure multiple application card system including an IC card comprising a microprocessor, a read-only memory and an electrically erasable programmable read only memory, said process comprising the steps of:

manufacturing said IC card and storing at the time of manufacture in said read-only memory an operating system and programming instructions including selected read-only programming instructions having selected addresses;

personalizing said IC card after said time of manufacture by storing in said electrically erasable programmable read only memory an address table with the selected addresses, wherein the operating system is incapable of accessing any programming instruction not associated with at least one address indicated in the address table; and storing additional programming instructions in said electrically erasable programmable read only memory, and inserting addresses for said additional programming instructions in said address table, wherein said additional programming instructions correspond to updated versions of the selected read-only programming instructions and the step of inserting addresses in said address table comprises overwriting the selected addresses with corresponding addresses of the additional programming instructions, wherein the overwriting step renders the address table devoid of the selected addresses, thereby rendering the selected read-only programming instructions inaccessible after the overwriting step.

36. The process of claim 35, wherein said programming instructions comprise at least one primitive.

37. The process of claim 36, wherein said address table comprises a listing of the names of the primitives to be called and memory addresses containing the primitives.

38. The process of claim 35, wherein said programing instructions comprise at least one codelet.

39. The process of claim 38, wherein said address table comprises a listing of the names of the codelets to be called and memory addresses containing the codelets.

40. A process for providing a secure multiple application card comprising a microprocessor, a first memory and second memory, said process comprising the steps of:

storing in said first memory an operating system and programming instructions including selected programming instructions having selected addresses;

personalizing said card after said storing step by storing in said second memory an address table with the selected addresses, wherein said operating system is incapable of accessing any programming instruction not associated with at least one address indicated in the address table; and storing additional programming instructions in said second memory, and inserting addresses for said additional programming instructions in said address table, wherein said additional programming instructions correspond to updated versions of the selected programming instructions and the step of inserting addresses in said address table comprises overwriting the selected addresses with corresponding addresses of the additional programming instructions, wherein the overwriting step renders the address table devoid of the selected addresses, thereby rendering the selected programming instructions inaccessible after the overwriting step, and wherein the selected programming instructions remain in the first memory after the overwriting step.

41. The process of claim 40 wherein said programming instructions comprises at least one primitive.

42. The process of claim 40 wherein said programming instructions comprises at least on codelet.

43. A secure multiple application card system, comprising:

an IC card, comprising:
a microprocessor,
a read-only memory, and
an electrically erasable programmable read only memory;

means for manufacturing the IC card and for storing at the time of manufacture in the read-only memory an operating system and a first set of programming instructions having a first address, without an address table containing a second address of a second set of programming instructions; and means for storing, at a second time after the time of manufacture, in the electrically erasable programmable read only memory, the address table containing the second address, wherein the operating system is incapable of accessing any set of programming instructions not having an address indicated in the address table, and wherein the address table is devoid of the first address such that the first set of programming instructions is rendered inaccessible after the second time.

44. The system of claim 43, wherein the second set of programming instructions replaces the first set of programming instructions at the second time.

45. A process for providing a secure multiple application card system including an IC card comprising a microprocessor, a read-only memory, and an electrically erasable programmable read only memory, said process comprising the steps of:

manufacturing the IC card and storing at the time of manufacture in the read-only memory an operating system and a first set of programming instructions having a first address, without an address table containing a second address of a second set of programming instructions; and storing, at a second time after the time of manufacture, in the electrically erasable programmable read only memory, the address table containing the second address, wherein the operating system is incapable of accessing any set of programming instructions not having an address indicated in the address table, and wherein the address table is devoid of the first address such that the first set of programming instructions is rendered inaccessible after the second time.

46. The process of claim 45, wherein the second set of programming instructions replaces the first set of programming instructions at the second time.

47. A process for providing a secure multiple application card comprising a microprocessor, a first memory, and a second memory, said process comprising the steps of:

manufacturing the card and storing at the time of manufacture in the first memory an operating system and a first set of programming instructions having a first address, without an address table containing a second address of a second set of programming instructions;

storing, at a second time after the time of manufacture, in the second memory, the address table containing the second address, wherein the operating system is incapable of accessing any set of programming instructions not having an address indicated in the address table, wherein the address table is devoid of the first address such that the first set of programming instructions is rendered inaccessible after the second time, and wherein the first set of programming instructions remains in the first memory after the second time.

48. The process of claim 47, wherein the second set of programming instructions replaces the first set of programming instructions at the second time.

* * * * *